(12) United States Patent
Jang et al.

(10) Patent No.: US 7,783,181 B2
(45) Date of Patent: Aug. 24, 2010

(54) SHAKE CORRECTION MODULE FOR PHOTOGRAPHING APPARATUS

(75) Inventors: Young-soo Jang, Changwon (KR); Jung-su Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 12/287,736

(22) Filed: Oct. 14, 2008

(65) Prior Publication Data
US 2009/0097834 A1    Apr. 16, 2009

(30) Foreign Application Priority Data
Oct. 15, 2007    (KR) ................... 10-2007-0103705

(51) Int. Cl.
*G03B 17/00*    (2006.01)
(52) U.S. Cl. .................. 396/55; 348/208.99
(58) Field of Classification Search ............ 396/55
See application file for complete search history.

(56) References Cited

U.S. PATENT DOCUMENTS 7,529,476 B2 * 5/2009 Kurosawa ............ 396/55
2005/0265705 A1 * 12/2005 Uenaka ............... 396/55
2007/0009244 A1 * 1/2007 Takahashi ............ 396/55
2007/0025710 A1 * 2/2007 Shin et al. ........... 396/55
2007/0292119 A1 * 12/2007 Lee ................... 396/55
2008/0303907 A1 * 12/2008 Lee ................... 348/208.7

* cited by examiner

*Primary Examiner*—W. B. Perkey
*Assistant Examiner*—Dennis Hancock
(74) *Attorney, Agent, or Firm*—Drinker Biddle & Reath LLP

(57) ABSTRACT

Provided is a shake correction module including: a base plate; a first movable slider member for accommodating an imaging device; a first drive portion for moving the first slider member in a first axis direction; a second movable slider member coupled with the first slider member; a second drive portion for moving the second slider member in a second axis direction; a support member attached to the base plate for pressing the first and second slider members toward the base plate; a first ferromagnetic support bearing between the base plate and the first slide member; and a second ferromagnetic support bearing between the first slider member and the second slider member. The module further includes at least one magnet for centering the first and second ferromagnetic support bearings in respective first and second bearing grooves that may be formed on the base plate and the first and second sliding members.

14 Claims, 8 Drawing Sheets

SHAKE CORRECTION MODULE FOR PHOTOGRAPHING APPARATUS

CROSS-REFERENCE TO RELATED PATENT APPLICATION

This application claims the benefit of Korean Patent Application No. 10-2007-0103705, filed on Oct. 15, 2007, in the Korean Intellectual Property Office, the disclosure of which is incorporated herein in its entirety by reference.

BACKGROUND OF THE INVENTION

1. Field of the Invention

The present invention relates to a photographing apparatus, and more particularly, to a shake correction module for a photographing apparatus, which can reduce the effect of shaking during photographing.

2. Description of the Related Art

Along with the widespread use of photographing apparatuses such as digital still cameras and digital video cameras, the desire of users to take higher quality photos and motion pictures is increasing.

Shake correction modules are increasingly being adopted in photographing apparatuses to prevent degradation in the resolution of photos due to a user's shake.

A conventional shake correction module uses a method of performing a shake correction function by moving a shake correction lens or imaging device.

FIG. 1 is a perspective view of a conventional shake correction module 1 in which a shake correction function is performed by moving an imaging device.

Referring to FIG. 1, the conventional shake correction module 1 includes a base plate 2, a slider member 3, and an imaging device base 4.

The base plate 2 is installed at a lens barrel (not shown) of a photographing apparatus.

The slider member 3 is installed on the base plate 2 and is capable of reciprocating in an x-axis direction with respect to the base plate 2.

The imaging device base 4 is installed at the slider member 3. An imaging device (not shown) such as a charge coupled device (CCD) is installed in the imaging device base 4.

Also, the imaging device base 4 is configured to reciprocate in a y-axis direction with respect to the slider member 3. Thus, the imaging device can reciprocate in x and y axes directions with respect to the base plate 2. Although not illustrated in FIG. 1, the slider member 3 and the imaging device base 4 are moved respectively by a drive unit.

Thus, when a shake occurs in a photographing apparatus, the shake correction module 1 compensates for the shake by moving the imaging device base 4 in the x and y axes directions.

A spring 5 is installed between a protruding portion 3a of the slider member 3 and a protruding portion 2a of the base plate 2. The spring 5 provides an elastic force to prevent the slider member 3 and the imaging device base 4 from separating from the base plate 2 in a z-axis direction.

However, in the structure of the conventional shake correction module 1, during the shake correction, since the spring 5 is used only at a side of the slider member 3, the operation of the elastic force is not uniformly applied to the whole surface of the shake correction module 1. Thus, during the shake correction, since the base plate 2, the slider member 3, and the imaging device base 4 move by being inclined to one another, the correction performance of the shake correction module 1 is deteriorated. That is, as the elastic force is maximal around a portion of the shake correction module 1 where the spring 5 is installed, the inclination of parts increases. Accordingly, a contact pressure between parts becomes excessive and accordingly a frictional force increases. Thus, the shake correction is not smoothly performed.

SUMMARY OF THE INVENTION

The present invention provides a shake correction module for a photographing apparatus, which can be used to stably perform a shake correction function.

According to an aspect of the present invention, there is provided a shake correction module including: a base plate; a first slider member capable of moving with respect to the base plate and accommodating an imaging device; a first drive portion moving the first slider member in a first axis direction; a second slider member capable of moving in a second axis direction that is cross to the first axis direction; a second drive portion moving the second slider member in the second axis direction; a support member attached to the base plate and pressing one of the first and second slider members; a first support bearing disposed between the base plate and the first slide member, the first support bearing being formed of a ferromagnetic substance; and a second support bearing disposed between the first slider member and the second slider member, the second support bearing being formed of a ferromagnetic substance. A first bearing groove, in which the first support bearing member is installed, may be formed in at least one of the base plate and the first slider member. A second bearing groove, in which the second support bearing is installed, may be formed in at least one of the first slider member and the second slider member. The module may further include a first central magnet embedded in a part of at least one of the base plate, the first slider member and the second slider member such that the first central magnet corresponds to the central portion of the first bearing groove and the second bearing groove.

The first slider member may include an imaging device accommodation portion for accommodating the imaging device.

The shake correction module may further include an elastic member disposed between the imaging device accommodation portion and the imaging device.

The shake correction module may further include a movement measuring magnet disposed at a side of the first slider member and a Hall sensor installed at a portion of the base plate corresponding to the movement measuring magnet.

The shake correction module may further include a pressing magnet arranged at a side of the second slider member and a ferromagnet installed in the base plate to correspond to the pressing magnet.

Each of the first drive portion and the second drive portion may include a piezoelectric motor.

The first axis direction and the second axis direction may be perpendicular to each other.

The support member may include a plurality of support legs attached to the base plate. The support legs may include mounting holes having threads formed on inner circumferential surfaces thereof. First installation holes formed in the base plate may be configured to correspond to the mounting holes such that the support legs are coupled to the base plate by inserting a bolt in the mounting hole through the first installation hole.

The support member may include a plurality of pressing portions pressing the second slider member.

The shake correction module may further include a third support bearing disposed between the second slider member and one of the pressing portions.

The third support bearing may be formed of a ferromagnetic substance, a third bearing groove for installing the third support bearing therein is formed in one of the pressing portions, and a second central magnet may be embedded in a part of one of the pressing portions, which corresponds to the central portion of the third support bearing groove.

The shake correction module may further include a control circuit board attached to an upper surface of the support member.

The first bearing groove and the second bearing groove may be formed in the first slider member to face each other, and the first central magnet may be embedded between the first bearing groove and the second bearing groove.

DETAILED DESCRIPTION OF THE EMBODIMENTS

Hereinafter, the present invention will be described in detail by explaining exemplary embodiments of the invention with reference to the attached drawings.

Figure 1:
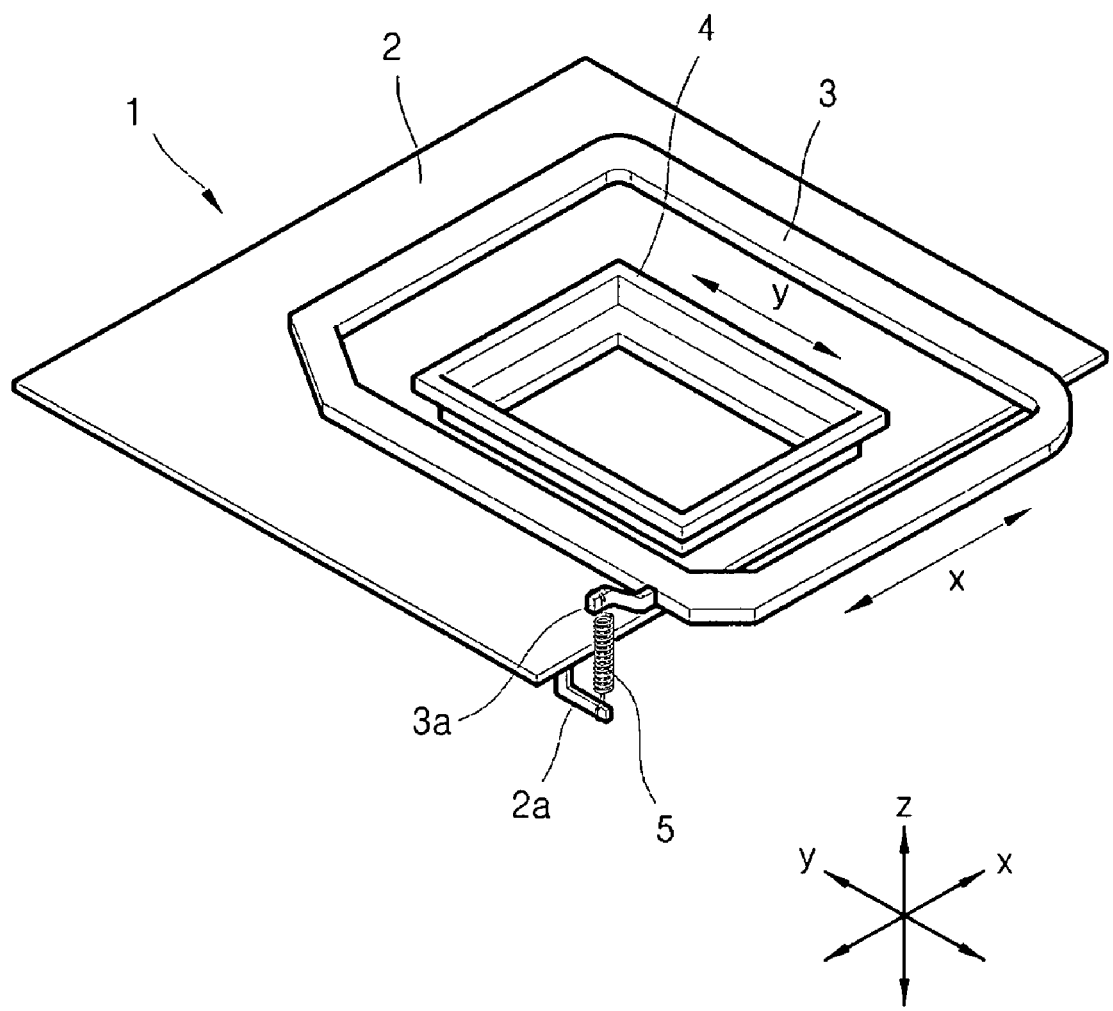
FIG. 1 is a perspective view of a conventional shake correction module.
Figure 2:
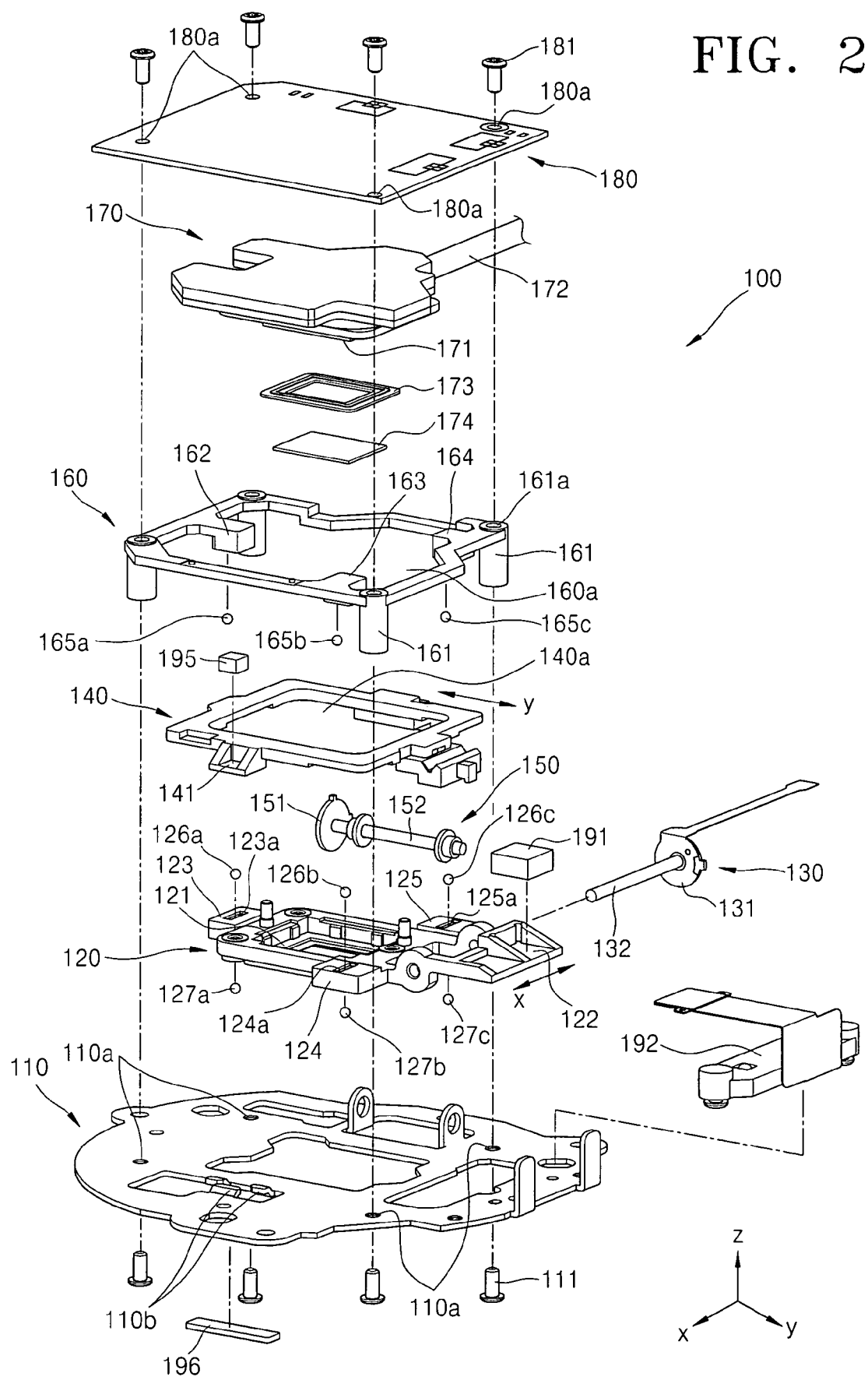
FIG. 2 is an exploded perspective view of a shake correction module for a photographing apparatus, according to an embodiment of the present invention.
Figure 3:
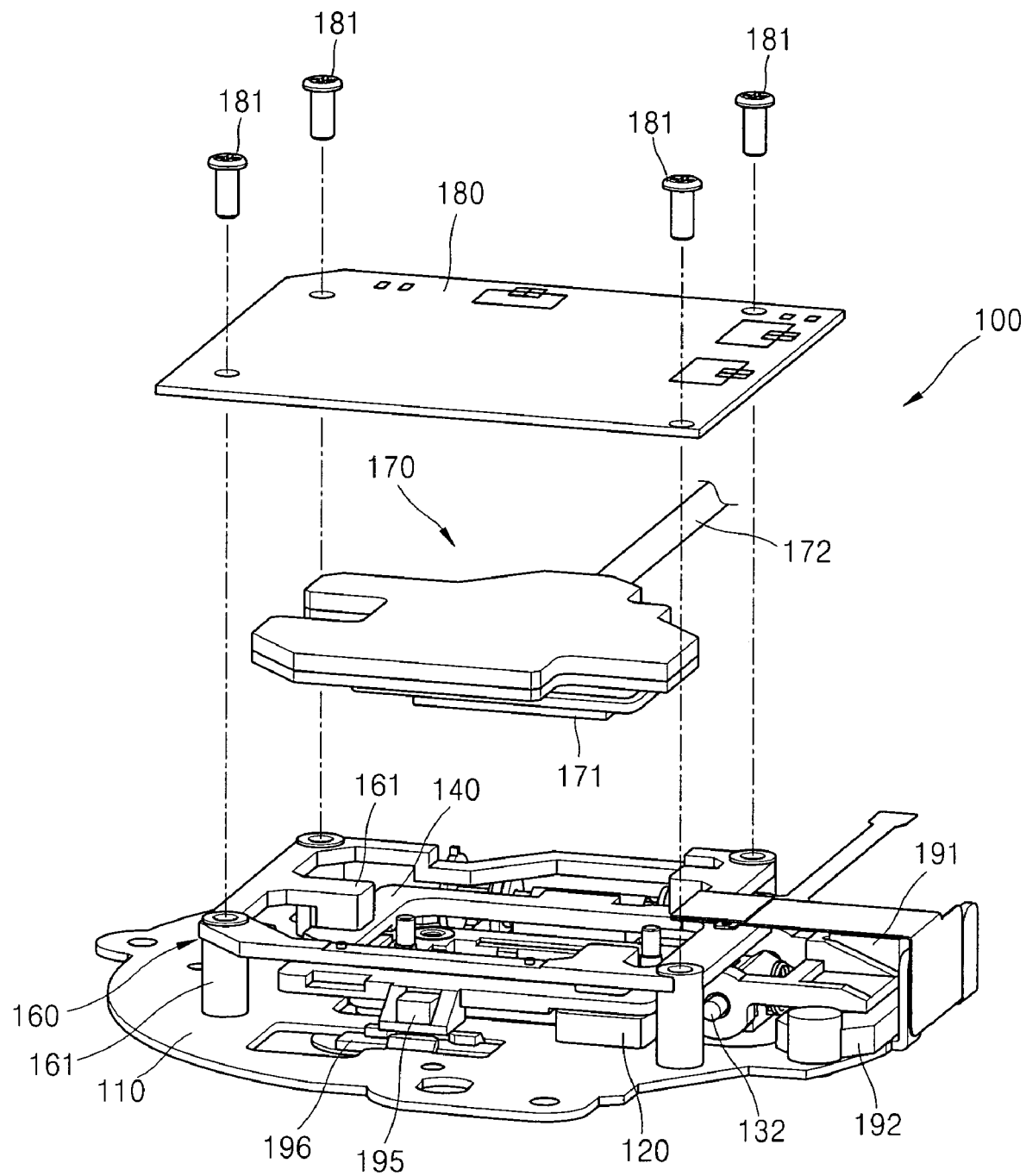
FIG. 3 is a partially assembled perspective view of the shake correction module of FIG. 2, according to an embodiment of the present invention.
Figure 4:
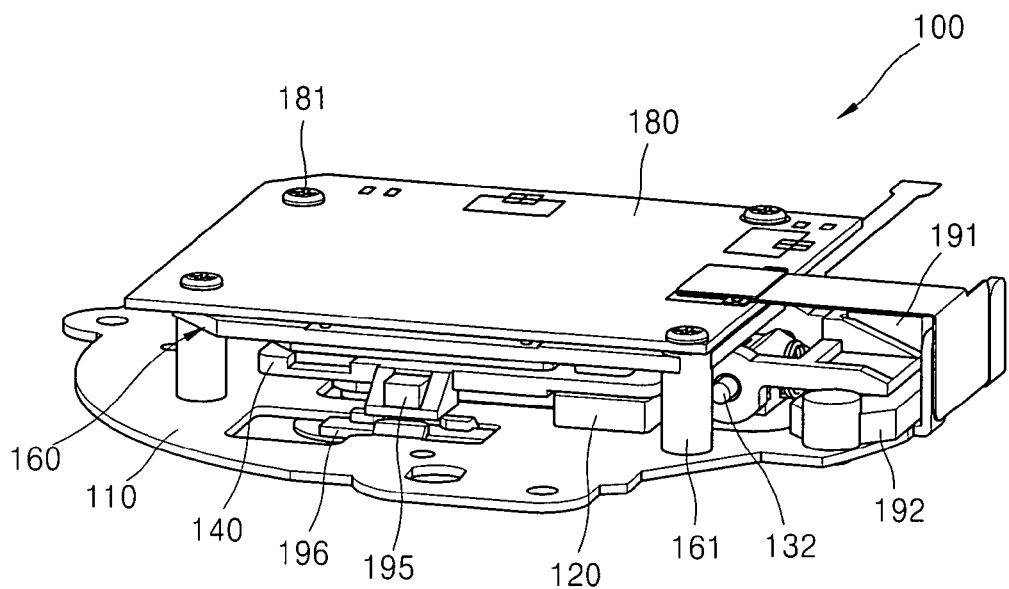
FIG. 4 is an assembled perspective view of the shake correction module of FIG. 2, according to an embodiment of the present invention.

FIG. 2 is an exploded perspective view of a shake correction module 100 for a photographing apparatus, according to an embodiment of the present invention. FIG. 3 is a partially assembled perspective view of the shake correction module 100 of FIG. 2, according to an embodiment of the present invention. FIG. 4 is an assembled perspective view of the shake correction module 100 of FIG. 2, according to an embodiment of the present invention.

Referring to FIG. 2, the shake correction module 100 for a photographing apparatus according to an embodiment of the present invention includes a base plate 110, a first slider member 120, a first drive portion 130, a second slider member 140, a second drive portion 150, a support member 160, an imaging device assembly 170, and a control circuit board 180.

For convenience of explanation, directions upper or top and lower or bottom will be taken in the context of FIG. 2 such that the base plate 110 is arranged at the lowermost side of the shake correction module 100. The base plate 110 may be formed of metal or synthetic resin that has a relatively high rigidity, and functions as the main frame of the shake correction module 100.

The base plate 110 has a plate shape. Four first installation holes 110a for attaching the support member 160 to the base plate 110 are formed in the base plate 110. A ferromagnetic accommodation portion 110b for accommodating a ferromagnet 196 is also formed in the base plate 110.

The first slider member 120 is capable of moving with respect to the base plate 110.

The first slider member 120 includes an imaging device accommodation portion 121 for accommodating an imaging device 171. The first slider member 120 further includes a magnetic arrangement portion 122 for measuring movement that is formed at a side of the first slider member 120.

A movement measuring magnet 191 is disposed in the magnetic arrangement portion 122 to measure the movement of the first slider member 120 relative to the generally stationary base plate 110. That is, since a Hall sensor 192 is installed at a portion of the base plate 110 corresponding to the movement measuring magnet 191, the movements of the first slider member 120 and the imaging device 171 (which is coupled with/inserted into the accommodation portion 121) in first and second axis directions can be measured. Here, the Hall sensor 192 is a device using a principle that the amount of a current or voltage that is induced changes according to the strength of a magnetic field.

In the present embodiment, the first axis direction is the x-axis direction, the second axis direction is the y-axis direction, and the first and second axis directions are perpendicular to each other. However, the present invention is not limited thereto. That is, the first and second axis directions are not necessarily the x axis and the y axis, respectively. Also, the first and second axis directions are preferably non-parallel such that they may cross or intersect with each other to define an angle between the first and second axis directions that may be an acute angle or an obtuse angle.

The first drive portion 130 is installed in the second slider member 140 and includes a first piezoelectric motor 131 and a first drive shaft 132.

The first drive shaft 132 is coupled to the first slider member 120. When the first piezoelectric motor 131 is driven, the first drive shaft 132 moves linearly to, thereby, move the first slider member 120 linearly in the x-axis direction.

According to the present embodiment, the first drive portion 130 includes the first piezoelectric motor 131, however, the present invention is not limited thereto. That is, the type of apparatus providing a driving force of the first drive portion 130 is not particularly limited and any apparatus capable of reciprocating the first drive shaft 132 in a linear direction, for example by receiving an external signal, can be employed.

The first drive portion 130 may be embodied by, for example, an electromagnetic apparatus or a micro motor.

Figure 5:
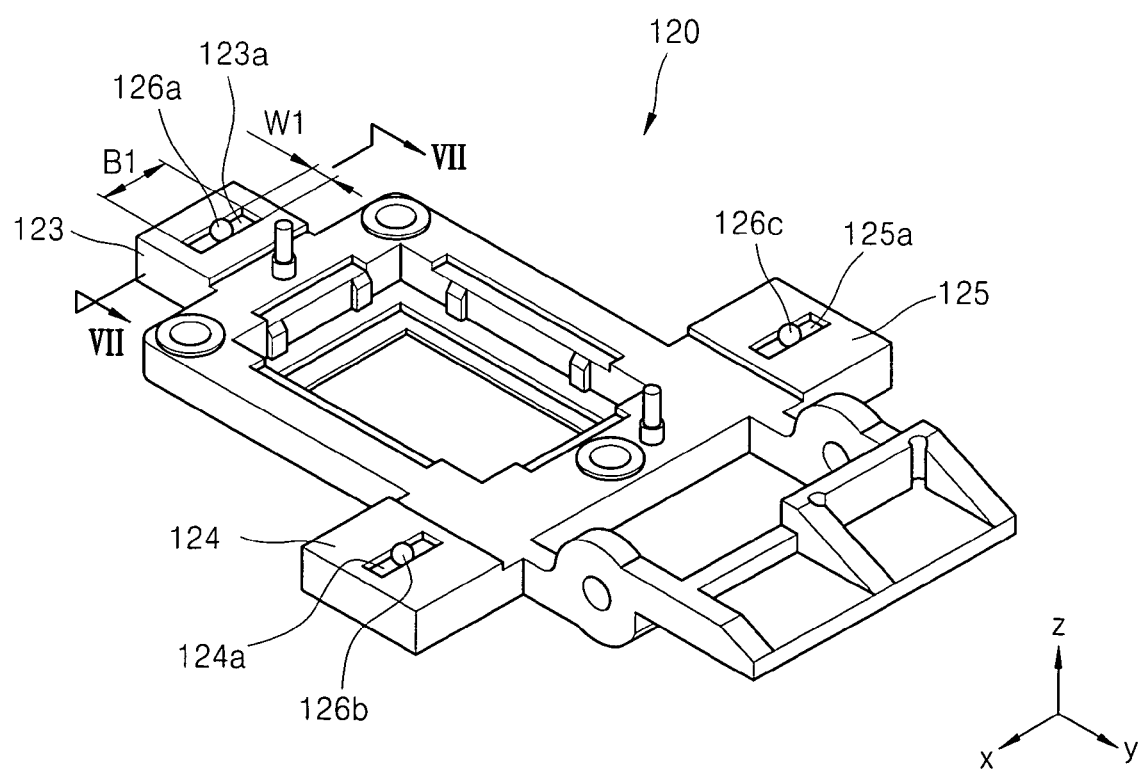
FIG. 5 is a perspective view showing an upper surface of a first slider member illustrated in FIG. 2, according to an embodiment of the present invention.
Figure 6:
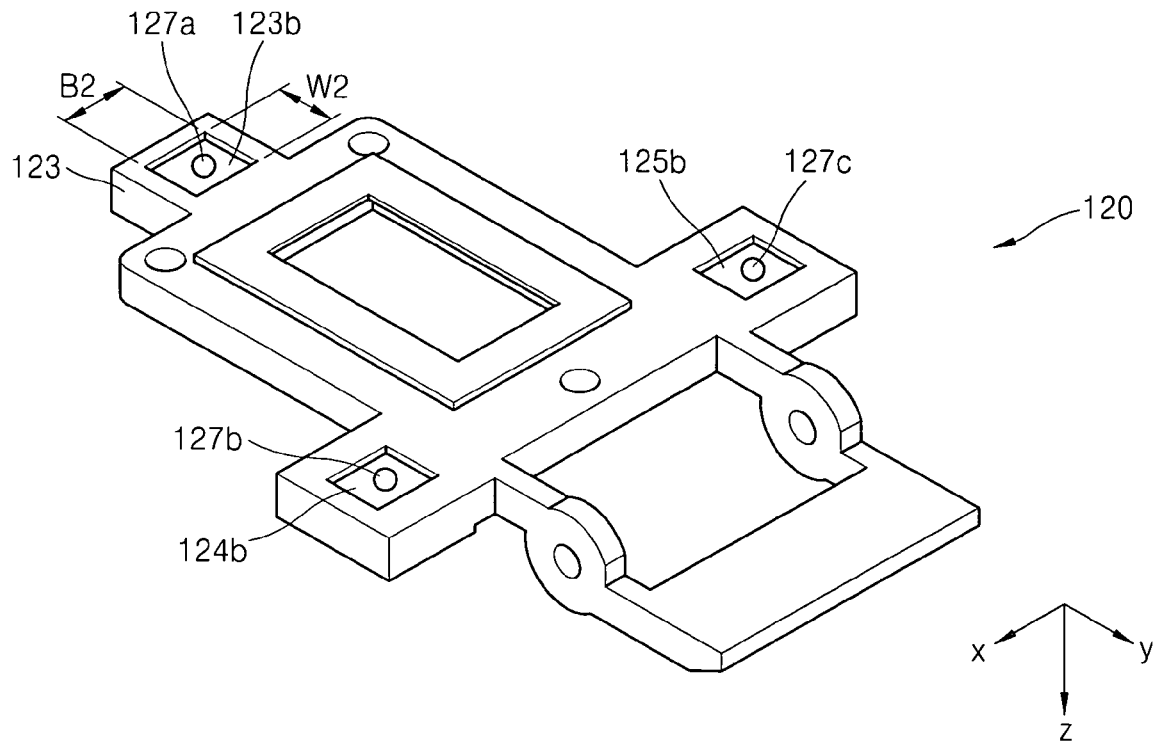
FIG. 6 is a perspective view showing a bottom surface of the first slider member shown in FIG. 5, according to an embodiment of the present invention.
Figure 7:
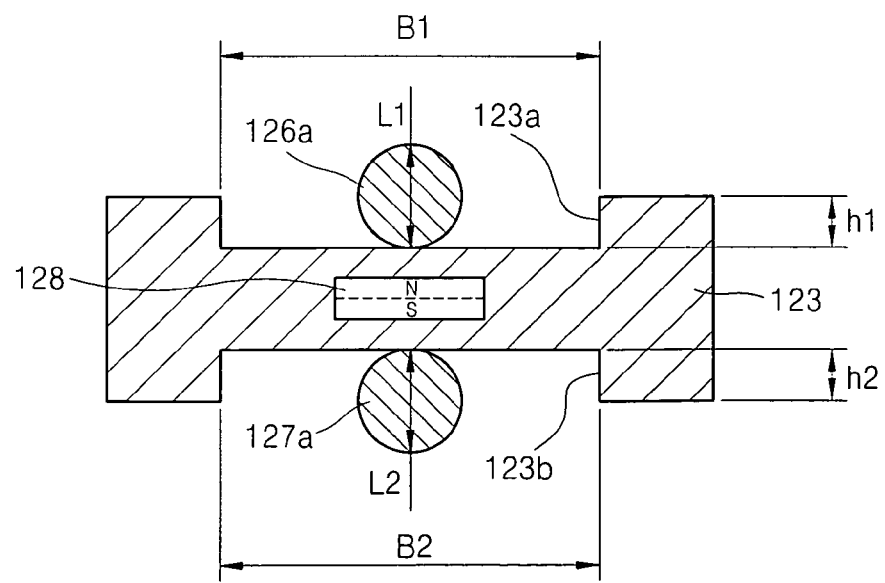
FIG. 7 is a cross-sectional view of the first slider member of FIGS. 5 and 6 taken along a line VII-VII shown in FIG. 5, according to an embodiment of the present invention.

FIG. 5 is a perspective view showing an upper surface of the first slider member 120 illustrated in FIG. 2, according to an embodiment of the present invention. FIG. 6 is a perspective view showing a bottom surface of the first slider member 120 illustrated in FIG. 2, according to an embodiment of the present invention. FIG. 7 is a cross-sectional view of the first slider member 120 taken along a line VII-VII of FIG. 5, according to an embodiment of the present invention.

Referring to FIGS. 2, and 5-7, the first slider member 120 is shown as including groove forming portions 123, 124 and 125. First bearing grooves 123a, 124a and 125a are respectively formed in upper surfaces of the groove forming portions 123, 124 and 125. Second bearing grooves 123b, 124b and 125b are respectively formed in bottom surfaces of the groove forming portions 123, 124 and 125.

The first bearing grooves 123a, 124a and 125a and the second bearing grooves 123b, 124b and 125b are formed so as to respectively face each other as is best illustrated in FIG. 7 which shows complementary upper/lower grooves 123a and 123b.

First support bearings 126a, 126b and 126c are respectively disposed in the first bearing grooves 123a, 124a and 125a to reduce friction between the first slider member 120 and the second slider member 140.

The first bearing grooves 123a, 124a and 125a may be formed as follows.

Since a relative motion of the first slider member 120 and the second slider member 140 occurs along the x-axis direction, the length B1 of each of the first bearing grooves 123a, 124a and 125a, which is measured in the x-axis direction, is greater than the width W1 of each of the first bearing grooves 123a, 124a and 125a, which is measured in the y-axis direction. In addition, since the relative motion of the first slider member 120 and the second slider member 140 is limited to the x-axis direction, the width W1 measured in the y-axis direction is approximately the same as the diameter L1 of each of the first support bearings 126a, 126b and 126c. Thus, the first bearing grooves 123a, 124a and 125a constrain movement of the respective first support bearings 126a, 126b and 126c such that the bearings roll only along the x-axis direction.

Referring to FIG. 7, the depth h1 of each of the first bearing grooves 123a, 124a and 125a is less than the diameter L1 of each of the first support bearings 126a, 126b and 126c. Thus, the first support bearings 126a, 126b and 126c can support the second slider member 140 above the surface of the first slider member 120.

In the present embodiment, the length B1 of each of the first bearing grooves 123a, 124a and 125a, which is measured in the x-axis direction, is greater than the width W1 of each of the first bearing grooves 123a, 124a and 125a, which is measured in the y-axis direction. However, the present invention is not limited thereto. That is, according to the present invention, there is no limitation in the length B1 of each of the first bearing grooves 123a, 124a and 125a, which is measured in the x-axis direction. Furthermore, there is no limitation in the width W1 of each of the first bearing grooves 123a, 124a and 125a, which is measured in the y-axis direction.

As shown in FIG. 6, second support bearings 127a, 127b and 127c are respectively disposed in the second bearing grooves 123b, 124b and 125b. As can be appreciated from FIG. 2, the second support bearings 127a, 127b and 127c reduce friction between the first slider member 120 and the base plate 110.

The second bearing grooves 123b, 124b and 125b may be formed as follows.

Since a relative motion of the first slider member 120 and the base plate 110 may occur in the x-axis direction and the y-axis direction, the length B2 of each of the second bearing grooves 123b, 124b and 125b, which is measured in the x-axis direction, may be the same as the width W2 of each of the second bearing grooves 123b, 124b and 125b, which is measured in the y-axis direction. Accordingly, the second bearing grooves 123b, 124b and 125b are shown in FIG. 7 to be generally square-shaped in contrast to the first bearing grooves 123a, 124a and 125a that are shown in FIG. 6 to be generally rectangular-shaped.

The depth h2 of each of the second bearing grooves 123b, 124b and 125b is smaller than the diameter L2 of each of the second support bearings 127a, 127b and 127c. Thus, the second support bearings 127a, 127b and 127c can support the first slider member 120 above a top surface of the base plate 110.

The first support bearings 126a, 126b and 126c and the second support bearings 127a, 127b and 127c are formed of a ferromagnetic material, and thus the first support bearings 126a, 126b and 126c and the second support bearings 127a, 127b and 127c respond to a magnetic force.

In the present embodiment, the first support bearings 126a, 126b and 126c and the second support bearings 127a, 127b and 127c are ball bearings. However, the present invention is not limited thereto. That is, according to the present invention, the first support bearings 126a, 126b and 126c and the second support bearings 127a, 127b and 127c can also be, for example, roller bearings.

In the present embodiment, the first bearing grooves 123a, 124a and 125a and the second bearing grooves 123b, 124b and 125b are all formed only on the first slider member 120. However, the present invention is not limited to such a configuration. That is, according to the present invention, the first bearing grooves 123a, 124a and 125a may be formed only on the bottom surface of the second slider member 140, or alternatively, on the first slider member 120 and the second slider member 140. In addition, the second bearing grooves 123b, 124b and 125b may be formed only on an upper surface of the base plate 110, or alternatively, on the first slider member and the base plate 110.

As can be appreciated from FIG. 7, first central magnets 128 are embedded in the groove forming portions 123, 124 and 125 of the first slider member 120. The module 100 may include three first central magnets 128.

The three first central magnets 128 are respectively arranged between the first bearing grooves 123a, 124a and 125a and the respective second bearing grooves 123b, 124b and 125b. As shown, in FIG. 7, the magnet 128 is generally configured to be in the central portion of the first and second bearing grooves.

The magnetic poles of the first central magnets 128 are arranged in a vertical line passing through the first bearing grooves 123a, 124a and 125a and the second bearing grooves 123b, 124b and 125b, respectively. In the present embodiment, the first central magnets 128 are permanent magnets; however, the present invention is not limited thereto. That is, the first central magnets 128 may be electromagnets or the like.

According to the present embodiment, the three first central magnets 128 are arranged between each of the first bearing grooves 123a, 124a and 125a, and each of the second bearing grooves 123b, 124b and 125b, respectively. However, the present invention is not limited thereto. That is, the first central magnets 128 may be arranged to correspond to each of the first bearing grooves 123a, 124a and 125a, and to each of the second bearing grooves 123b, 124b and 125b such that the number of the first central magnets 128 may be six.

The first central magnets 128 attract the first support bearings 126a, 126b and 126c and the second support bearings 127a, 127b and 127c due to magnetic force. Thus the first support bearings 126a, 126b and 126c and the second support bearings 127a, 127b and 127c can be respectively arranged in the central portions of the first bearing grooves 123a, 124a and 125a and the second bearing grooves 123b, 124b and 125b.

That is, as a sliding operation for shake correction is performed, when each of the first support bearings 126a, 126b and 126c, and each of the second support bearings 127a, 127b and 127c are respectively pressed by the second slider member 140 and the base plate 110 to contact the second slider member 140 and the base plate 110, the first support bearings 126a, 126b and 126c and the second support bearings 127a, 127b and 127c roll by contact force. However, when the each of the first support bearings 126a, 126b and 126c, and each of the second support bearings 127a, 127b and 127c do not contact both of the second slider member 140 and the base plate 110, each of the first support bearings 126a, 126b and 126c, and each of the second support bearings 127a, 127b and 127c move to the central portions of each of the first bearing grooves 123a, 124a and 125a, and each of the second bearing grooves 123b, 124b and 125b, respectively, due to attraction forces of the first central magnets 128. Thus, the sliding operation can be performed at a predetermined velocity, and stable shake correction can be performed. Descriptions of these operations will be provided later.

As best shown in FIG. 2, the second slider member 140 is disposed above the first slider member 120. The second slider member 140 has an opening 140a in the center thereof, and has a shape of a rectangular ring.

Although in the present embodiment the second slider member 140 has a rectangular ring shape and includes the opening 140a in the center thereof, the present invention is not limited thereto. That is, there is no limitation in the shape of the second slider member 140. For example, the second slider member 140 can have a variety of shapes such as a plate or a circular ring so long as the second slider member 140 may cooperate with the first slider member 120 for moving the imaging device 171 to compensate for a shake.

A pressing magnet arrangement portion 141 is provided at a side of the second slider member 140.

A pressing magnet 195 is disposed in the pressing magnet arrangement portion 141 so that the second slider member 140 more firmly contacts the base plate 110 thus facilitating movement control of the second slider member 140.

That is, as the ferromagnet 196 is disposed in the ferromagnetic accommodation portion 110b of the base plate 110, a magnetic force acts between the pressing magnet 195 and the ferromagnet 196 which pulls the second slider member 140 toward the base plate 110.

Although in the present embodiment the pressing magnet 195 is disposed in the pressing magnet arrangement portion 141 of the second slider member 140 and the ferromagnet 196 is disposed in the base plate 110, the present invention is not limited thereto. That is, according to the present invention, since the support member 160 may sufficiently press the second slider member 140, the pressing magnet 195 and the ferromagnet 196 do not need to be used for the purpose of simply pressing. However, for the movement control of the second slider member 140, when a magnetic force acts between the second slider member 140 and the base plate 110, it becomes easier to control the movement of the second slider member 140. Accordingly, such a structure is used in the present embodiment.

The second drive portion 150 is installed in the base plate 110 and includes a second piezoelectric motor 151 and a second drive shaft 152. The second drive shaft 152 is coupled to the second slider member 140. When the second piezoelectric motor 151 is driven, the second drive shaft 152 moves in a linear direction so that the second slider member 140 thereby moves linearly in the y axis direction.

According to the present embodiment, the first drive shaft 132 of the first drive portion 130 is arranged in the x-axis direction and the second drive shaft 152 of the second drive portion 150 is arranged in the y-axis direction. Accordingly, the movement direction of the first drive shaft 132 and the movement direction of the second drive shaft 152 are perpendicular to each other. However, the present invention is not limited to such a configuration. That is, according to the present invention, the movement direction of the first drive shaft 132 and the movement direction of the second drive shaft 152 can be configured to be intersecting but non-perpendicular to each other and to have a suitable angle therebetween. In this case, the angle between the relative movement directions of the first and second slider members can be acute or obtuse.

Although in the present embodiment the second drive portion 150 includes the second piezoelectric motor 151, the present invention is not limited thereto. That is, the type of apparatus providing a driving force to the second drive portion 150 is not particularly limited and any apparatus capable of reciprocating the drive shaft 152 in a linear direction by receiving an external signal can be employed. For example, an electromagnetic apparatus or a micro motor can be applied to the second drive portion 150.

An opening portion 160a (FIG. 2) is formed in the center of the support member 160. The support member 160 may have a rectangular ring shape and may include a plurality of support legs 161 and a plurality of pressing portions (e.g., three pressing portions 162, 163 and 164 being shown).

In the present embodiment, the support member 160 includes four support legs 161, each of which has a mounting hole 161a formed in the center thereof. The mounting hole 161a may have a thread formed on an inner circumferential surface thereof. Since the mounting holes 161a are formed to extend through each of the support legs 161, the support legs 161 have a substantially hollow cylindrical shape.

First installation bolts 111 are inserted in the mounting holes 161a by passing through the first installation holes 110a of the base plate 110 so that the support legs 161 of the support member 160 can be attached to the base plate 110.

Also, the support legs 161 function not only to attach the support member 160 to the base plate 110 but also to attach the control circuit board 180 to the support member 160.

Although in the present embodiment the number of the support legs 161 is four, the present invention is not limited thereto. That is, there is no special limitation on the number of the support legs 161.

As shown in FIG. 2, the pressing portions 162, 163 and 164 protrude inward toward the center of the support member 160 and have a function to directly press the second slider member 140 from above. For this purpose, third support bearings 165a, 165b and 165c are arranged between each of the pressing portions 162, 163 and 164 and the second slider member 140.

That is, as each of the lower parts of the third support bearings 165a, 165b and 165c contacts a part of an upper surface of the second slider member 140, the support member 160 presses the second slider member 140 downwardly.

Figure 8:
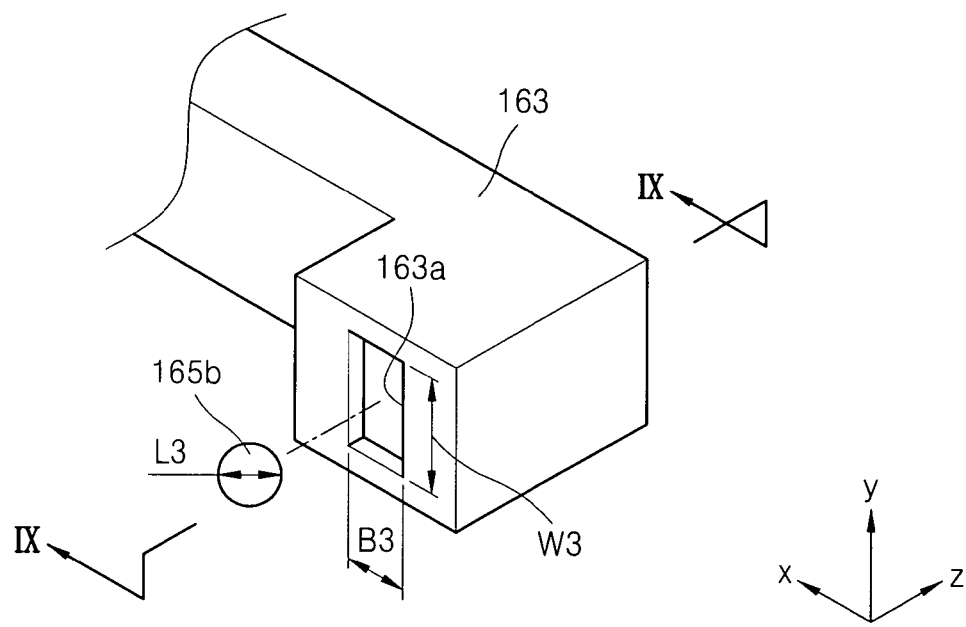
FIG. 8 is a perspective view of a bottom surface of a pressing portion of a support member, according to an embodiment of the present invention.
Figure 9:
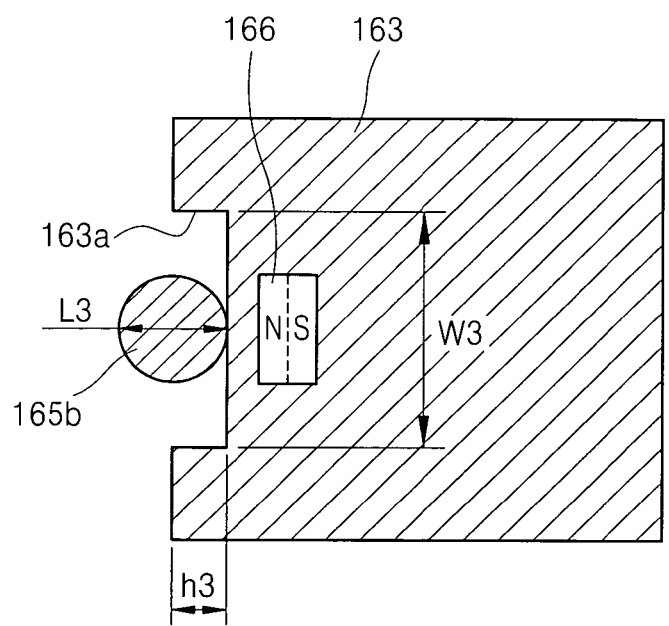
FIG. 9 is a cross-sectional view of the pressing portion of FIG. 8 taken along a line IX-IX shown in FIG. 8.

Third bearing grooves are formed in the bottom surface of each of the pressing portions 162, 163 and 164. Referring to FIGS. 8 and 9, one example third bearing groove (i.e., third bearing groove 163a of the pressing portion 163) will now be described.

FIG. 8 is a perspective view of a bottom surface of the pressing portion 163 of the support member 160, according to an embodiment of the present invention. FIG. 9 is a cross-sectional view of the pressing portion 163 taken along a line IX-IX of FIG. 8.

The third support bearing 165b is disposed in the third bearing groove 163a to reduce friction between the second slider member 140 and the support member 160.

The third bearing groove 163a may be formed as follows.

Since a relative motion of the second slider member 140 and the support member 160 occurs along the y-axis direction, the length B3 of the third bearing groove 163a, which is measured in the x-axis direction, is less than the width W3 of the third bearing groove 163a, which is measured in the y-axis direction. In addition, since the relative motion of the second slider member 140 and the support member 160 is limited to the y-axis direction, the length B3 of the third bearing groove 163a, which is measured in the x-axis direction is approximately the same as the diameter L3 of the third support bearing 165b. Thus, the third bearing groove 163a is generally configured to confine the third support bearing 165b to roll along only in the y-axis direction.

The depth h3 of the third bearing groove 163a is less than the diameter L3 of the third support bearing 165b. Thus, the third support bearing 165b can simultaneously contact the bottom of the third bearing groove 163a and the second slider member 140.

In the present embodiment, the length B3 of the third bearing groove 163a, which is measured in the x-axis direction, is less than the width W3 of the third bearing groove 163a, which is measured in the y-axis direction; however, the present invention is not limited thereto. That is, according to the present invention, there is no limitation in the length B3 of the third bearing groove 163a, which is measured in the x-axis direction, and the width W3 of the third bearing groove 163a, which is measured in the y-axis direction.

In the present embodiment, the third bearing grooves are formed only in each of the pressing portions 162, 163 and 164 of the support member 160; however, the present invention is not limited thereto. That is, according to the present invention, the third bearing grooves may be formed only in the second slider member 140, or alternatively, in the support member 160 and the second slider member 140.

Although in the present embodiment third support bearings 165a, 165b and 165c are ball bearings, the present invention is not limited thereto. That is, according to the present invention, the third support bearings 165a, 165b and 165c can also be, for example, roller bearings.

As can be appreciated from FIG. 9, second central magnets 166 are respectively embedded in the pressing portions 162, 163 and 164.

In the present embodiment of present invention, the second central magnets 166 are permanent magnets; however, the present invention is not limited thereto. That is, the second central magnets 166 may be electromagnets, or the like.

The second central magnets 166 are respectively arranged on portions, which respectively correspond to the central portion of each of third bearing grooves, which will now be described using the third bearing groove 163a that is one of the third bearing grooves, as an example. The other third bearing grooves of the pressing portions 162 and 164 are similar to the third bearing groove 163a, and thus their description will be omitted. The second central magnet 166 attracts the third support bearing 165b due to magnetic force, and thus the third support bearing 165b can be arranged and held in the central portion of the third bearing groove 163a.

That is, as a sliding operation for shake correction is performed, when the third support bearing 165b is pressed by the second slider member 140 and the pressing portion 163, the third support bearing 165b rolls by contact force. However, when the third support bearing 165b does not contact both of the second slider member 140 and the pressing portion 163, the third support bearing 165b moves to the central portion of the third bearing groove 163a due to attraction force of the second central magnets 166. Thus, the sliding operation can be performed at a predetermined velocity and stable shake correction can be performed. Descriptions of these operations will be provided later.

According to the present embodiment, the pressing portions 162, 163 and 164 are formed at three positions of the support member 160 in a triangular arrangement with the opening portion 160a at the center thereof, to uniformly press the second slider member 140. That is, a shake correction function can be stably performed due to the balanced pressing force maintained by the above arrangement. To uniformly press the upper portion of the second slider member 140, the pressing portions 162, 163 and 164 are appropriately arranged along the circumference of the support member 160.

Although in the present embodiment the support member 160 includes three pressing portions 162, 163 and 164, nevertheless, the present invention is not limited thereto. That is, the support member 160 may have fewer or additional pressing portions for uniformly pressing the second slider member 140 to maintain a balanced pressing force. For example, the supporting member 160 may include only one pressing portion, or four or more pressing portions.

As shown in FIG. 2, the imaging device assembly 170 includes the imaging device 171 and a cable 172.

The imaging device 171 is a device to convert input light which passes through lenses such as a zoom lens and a shake correction lens to an electrical signal. The imaging device 171 may be a charge coupled device (CCD) or a complementary metal oxide semiconductor (CMOS) device. Since a CMOS device can convert image light of an object to an electrical signal at a higher speed than a CCD device, a time for synthesizing an image after the object is photographed can be shortened.

The cable 172 can be various communication paths known in the art such as a wireless path or conductive members including a wire or wires, a trace or traces on a PCB, and a flexible printed circuit board (FPCB). A signal output from the imaging device 171 is transmitted via the cable 172 to a circuit (not shown) for processing an image in the photographing apparatus.

The imaging device 171 of the imaging device assembly 170 is accommodated in the imaging device accommodation portion 121 of first slider member 120. An elastic member 173 and an infrared (IR) filter 174 are arranged between the imaging device 171 and the imaging device accommodation portion 121.

The elastic member 173 may be formed of an elastic material such as synthetic rubber to prevent the imaging device 171 from directly contacting the IR filter 174 and accommodate the imaging device 171 in the imaging device accommodation portion 121 with an appropriate elasticity.

As shown in FIGS. 2-4, the control circuit board 180 is attached to an upper surface of the support member 160 to control the module 100 for performing the shake correction function. Namely the control circuit board 180 drives and controls the first drive portion 130 and the second drive portion 150, processes a signal obtained from the Hall sensor 192, and performs the shake correction function.

The control circuit board 180 is attached to the upper surface of the support member 160. For this purpose, a plurality of second installation holes 180a may be formed in the control circuit board 180. That is, as the second installation holes 180a are formed to correspond to the mounting holes 161a of the support legs 161, the control circuit board 180 can be attached to the upper surface of the support member 160 using a plurality of second installation bolts 181.

Although the shake correction module 100 according to the current embodiment of the present invention includes the control circuit board 180, the present invention is not limited thereto. That is, according to the present invention, the shake correction module 100 may not include the control circuit board 180. In this case, a CPU (not shown) of the photographing apparatus can perform the function of the control circuit board 180.

Hereinafter, the operations of the shake correction module 100 according to the present embodiment will now be described with reference to FIG. 2.

When a shake occurs during photographing, the shake is detected by a shake detection unit (not shown) provided in the photographing apparatus.

A gyro sensor or an acceleration sensor can be used as the shake detection unit. Data directly relating to the amount and direction of the shake, as measured by the shake detection unit, is transferred to the control circuit board 180. The shake detection unit can be arranged outside the control circuit board 180 or directly arranged on the control circuit board 180.

The control circuit board 180 calculates a movement for the first slider member 120 (and the imaging device 171 that is accommodated thereon) to correct or otherwise substantially counteract the detected shake. The calculated amount of the movement is measured in terms of movements in the first and second axis (e.g., x-axis and y-axis) directions.

Next, the control circuit board 180 drives the first drive portion 130 and the second drive portion 150 based on the calculated amount of the movements so that the first slider member 120 is moved by a calculated movement amount.

The first and second slider members 120, 140 are coupled together to move the imaging device 171 with two degrees of freedom (i.e., along the first and second axis directions). When the second slider member 140 moves in the y-axis direction, the first slider member 120 moves together with the second slider member 140. Thus, the control circuit board 180 drives the second drive portion 150 in order to move the first slider member 120 in the y-axis direction, and thus the second slider member 140 moves together with the first slider member 120.

In addition, the control circuit board 180 drives the first drive portion 130 in order to move the first slider member 120 in the x-axis direction, and then the control circuit board 180 linearly moves the first drive shaft 132.

The movements of the first slider member 120 in the x-axis and y-axis directions are measured using the movement measuring magnet 191 and the Hall sensor 192. The measured data is transferred to the control circuit board 180 to be used as a feedback signal to control the first and second drive portions 130 and 150.

As described above, when the first slider member 120 is appropriately moved in a direction to correct the shake, the imaging device 171 accommodated in the first slider member 120 is moved so that the shake correction is performed during photographing.

The support member 160 uniformly presses the second slider member 140 from above using the three pressing portions 162, 163 and 164 so that the movement of the first and second slider members 120 and 140 in the z-axis direction is restricted. Then, even when the first and second slider members 120 and 140 move for the shake correction, a relative inclination between parts is prevented and parallel movement is facilitated so that the shake correction performance is improved.

Also, since the support member 160 firmly presses the second slider member 140, even when a strong shock is applied from the outside, for example, caused by a user dropping the photographing apparatus, the first slider member 120 and the second slider member 140 of the shake correction module 100 are not dissembled but stably maintained so that the durability of the shake correction module 100 is improved.

In the present embodiment, the first central magnets 128 are respectively arranged in the groove forming portions 123, 124 and 125 of the first slider member 120, and the second central magnets 166 are respectively arranged in the pressing portions 162, 163 and 164 of the support member 160. Thus, the sliding operation for shake correction can be smoothly performed. The sliding operation will be described with reference to FIGS. 10 through 13.

Figure 10:
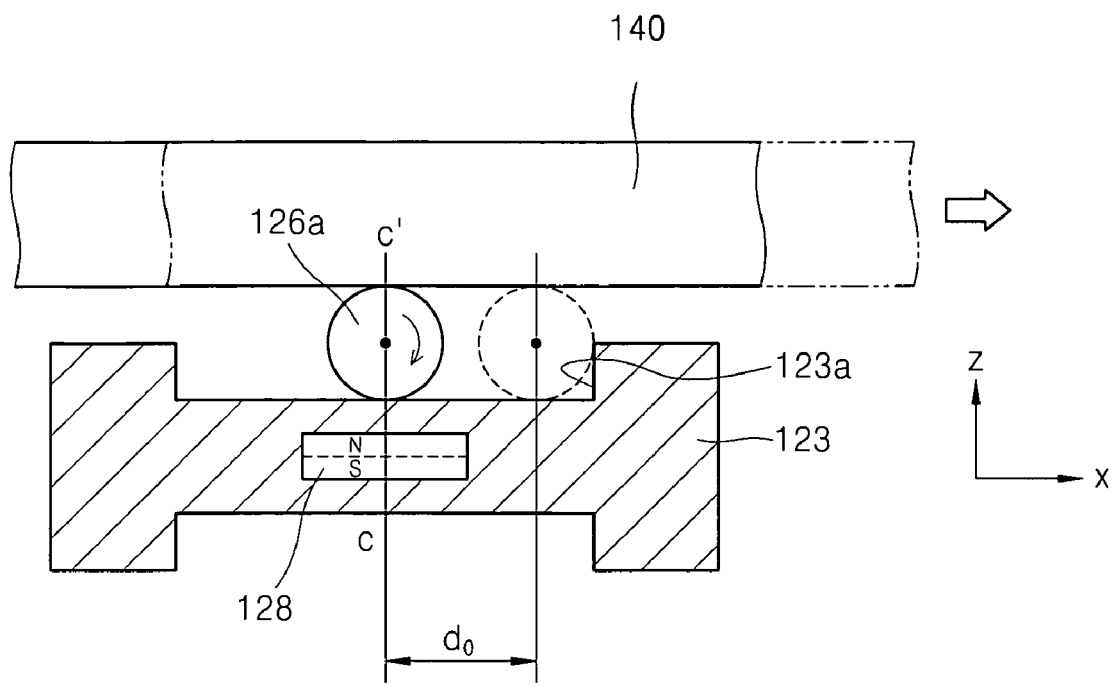
FIG. 10 is a cross-sectional view illustrating relative movement of a first slider member and a second slider member of the shake correction module of FIG. 2, according to an embodiment of the present invention.
Figure 11:
FIG. 11 is a graph illustrating a movement velocity when a first slider member illustrated in FIG. 10 moves, according to an embodiment of the present invention.

FIG. 10 is a cross-sectional view illustrating a case in which the first slider member 120 and the second slider member 140 contact each other using the first support bearing 126a as a medium. FIG. 11 is a graph illustrating a movement velocity when the first slider member 120 illustrated in FIG. 10 moves, according to an embodiment of the present invention.

Referring to FIG. 10, the first support bearing 126a indicated by a solid line is in an initial position, whereas the first support bearing 126a indicated by a dotted line is in a position to which the first support bearing 126a moves from the initial position by a distance $d_0$ during correction or compensation for a shake.

As shown, the first support bearing 126a at the initial position is centered on a vertical line C-C' passing through the center of the first bearing groove 123a due to an attraction force of the first central magnets 128.

Then, for a sliding operation for shake correction, the first slider member 120 moves in the x-axis direction. Although the first slider member 120 moves in the x-axis direction, and the second slider member 140 is substantially stationary with respect to the first slider member 120, in FIG. 10, to facilitate the understanding, the first slider member 120 is illustrated to be substantially stationary, and the second slider member 140 is illustrated to move. Regardless, there is relative movement between the first and second slider members 120, 140.

That is, the relative motion of the first slider member 120 and the second slider member 140 is performed. When a distance of relative motion required for the sliding operation for shake correction is $d_0$, the first support bearing 126a moves to the right by the distance $d_0$ while turning clockwise, and then the first support bearing 126a contacts a side of the first bearing groove 123a.

When the relative motion is performed as described above, a relative velocity of the first slider member 140 can be maintained as a predetermined velocity $v_1$ until the first slider member 140 moves by the distance $d_0$, as illustrated in FIG. 11. Thus, a sliding operation for shake correction can be stably performed when the movement distance of first slider member 120 is less than or equal to distance $d_0$.

Meanwhile, referring to FIGS. 12 and 13, a comparative example will now be described for comparison with the present invention.

Figure 12:
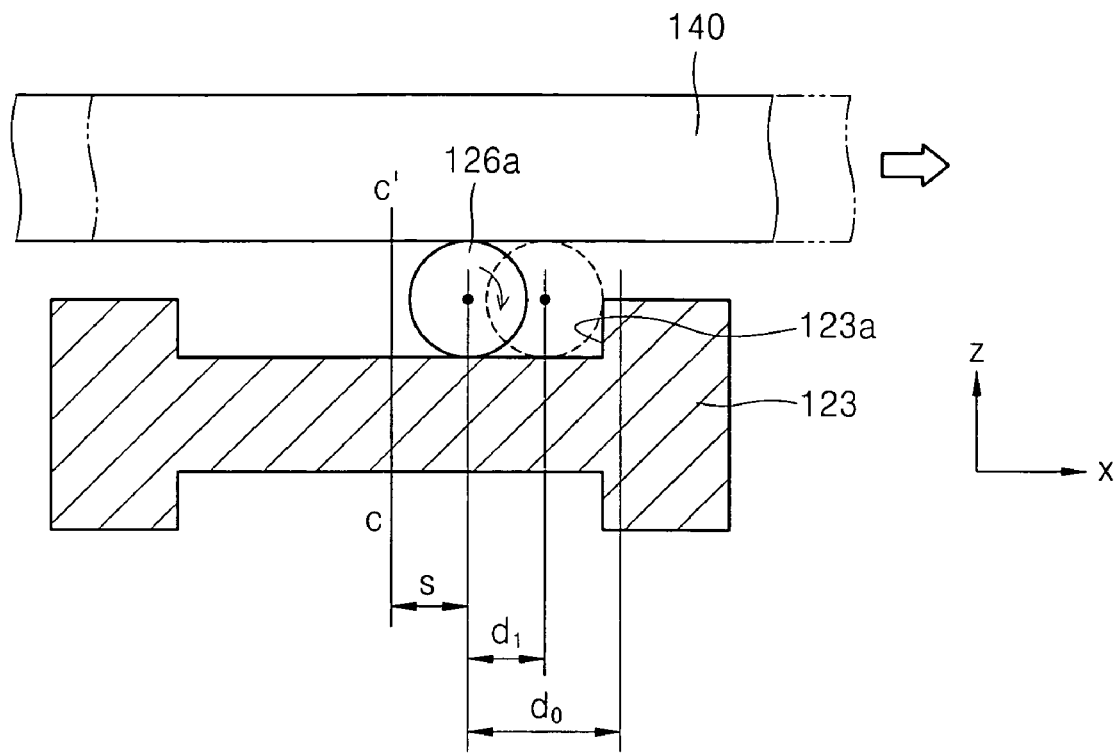
FIG. 12 is a cross-sectional view illustrating relative movement of a comparative example configuration of the first slider member and the second slider member of the shake correction module of FIG. 2 without first central magnets.
Figure 13:
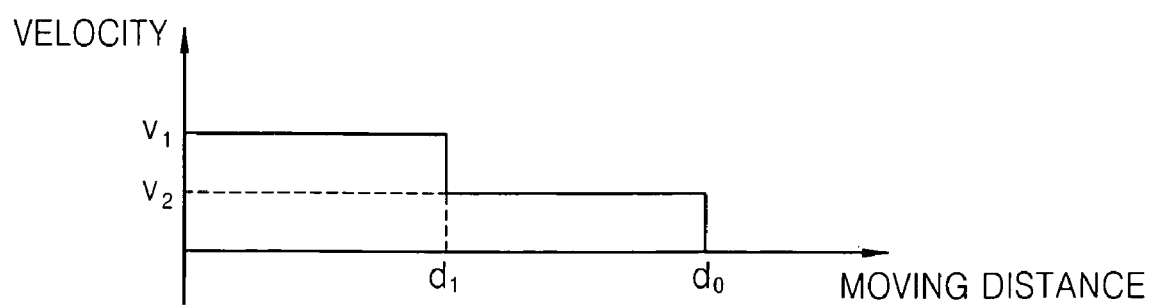
FIG. 13 is a graph illustrating a movement velocity when a first slider member illustrated in FIG. 12 moves.

FIG. 12 is a cross-sectional view of the previously described embodiment shown in FIG. 10 in which the first central magnets 128 are removed or otherwise not provided. As shown in FIG. 12 the first support bearing 126a is spaced from a central vertical line C-C' by a distance S. That is, the first support bearing 126a is not initially centered in the first bearing groove 123a. FIG. 13 is a graph illustrating a movement velocity when the first slider member 120 illustrated in FIG. 12 moves.

Here, since there are no first central magnets 128, and thus attraction force is not applied with respect to the first support bearing 126a of the initial position, the first support bearing 126a is spaced or offset from the central line C-C' of the first bearing groove 123a by the distance S.

In this case, the relative motion of the first slider member 120 and the second slider member 140 is performed. When a distance of relative motion required for the sliding operation for shake correction is $d_0$ in the positive x-axis direction, the first support bearing 126a moves to the right by the distance $d_1$ while turning clockwise, and then the first support bearing 126a contacts a side of the first bearing groove 123a. That is, the first support bearing 126a does not move by the distance $d_0$, but by the distance $d_1$ that is less than the distance $d_0$.

In this case, while the first support bearing 126a moves, a movement velocity of the first slider member 120 can be maintained as a velocity $v_1$. However, when the first slider member 120 continues to move after traversing the distance $d_1$, the first support bearing 126a (which has contacted an end of the first bearing groove 123a) does not turn clockwise freely and movement of the first slider member 120 is slowed due to friction of the bearing 126a against the end of the groove 123a. Thus, as illustrated in FIG. 13, the relative velocity of the first slider member 120 is reduced from $v_1$ to $v_2$, and the sliding operation is unstably performed. Referring to FIG. 13, the graph of the velocity can have a step difference.

Accordingly, in the present embodiment, if the initial position of the first support bearing 126a is the center of the first bearing groove 123a because of the first central magnet 128, a constant sliding velocity can be maintained when the shake correction module 100 is operated for shake correction, and thus stable shake correction can be performed. More particularly, the control circuit board 180 may control movement of the first slider member 120 such that member 120 moves a distance less than or equal to $d_0$ in the x-axis direction so that constant velocity movement is achieved in that direction. Similarly, the control circuit board 180 may control movement of the second slider member 140 such that member 140 moves a suitable distance (e.g., less than or equal to half of the width W2) in the y-axis direction so that constant velocity movement is achieved in that direction.

Likewise, each of the other first support bearings 126b and 126c, the second support bearings 127a, 127b and 127c, and the third support bearings 165a, 165b and 165c can have its initial position at the center of the first bearing grooves 124a and 125a, the second bearing grooves 123b, 124b and 125b, and the third bearing grooves, respectively, since the first central magnets 128 are included in the groove forming portions 123, 124 and 125, and the second central magnets 166 are included in the pressing portions 162, 163 and 164. Thus, a constant sliding velocity can be maintained when the shake correction module 100 is operated for shake correction, and thus stable shake correction can be performed.

As described above, since the shake correction module 100 for a photographing apparatus includes the support member 160, the second slider member 140 can be uniformly pressed. Thus, the shake correction can be stably performed.

In addition, the shake correction module 100 for a photographing apparatus can perform stable shake correction by respectively arranging the first central magnets 128 and the second central magnets 166 to correspond to the central portion of the first bearing grooves 123a, 124a and 125a, the second bearing grooves 123b, 124b and 125b, and the third bearing grooves 163a, respectively.

As described above, the shake correction module for a photographing apparatus according to the present invention can stably perform a shake correction function.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A shake correction module comprising:
   a base plate;
   a first slider member movable with respect to the base plate, the first slider member configured to accommodate an imaging device;
   a first drive portion for moving the first slider member in a first axis direction;
   a second slider member movable in a second axis direction that is cross to the first axis direction;
   a second drive portion for moving the second slider member in the second axis direction;
   a support member attached to the base plate for pressing the second slider member toward the base plate;
   a first support bearing disposed between the base plate and the first slide member, the first support bearing being formed of a ferromagnetic substance; and
   a second support bearing disposed between the first slider member and the second slider member, the first support bearing being formed of a ferromagnetic substance,
   wherein a first bearing groove, in which the first support bearing is installed, is formed in at least one of the base plate and the first slider member,
   wherein a second bearing groove, in which the second support bearing is installed, is formed in at least one of the first slider member and the second slider member, and
   wherein a magnet is embedded in at least one of the base plate and the first and second slider members for centering the first support bearing in the first bearing groove and for centering the second support bearing in the second bearing groove.

2. The shake correction module of claim 1, wherein the first slider member comprises an aperture for accommodating the imaging device.

3. The shake correction module of claim 2, further comprising an elastic member disposed between the aperture and the imaging device.

4. The shake correction module of claim 1, further comprising:
   a movement measuring magnet disposed at a side of the first slider member; and
   a Hall sensor installed at a portion of the base plate corresponding to the movement measuring magnet, the Hall sensor cooperating with the movement measuring magnet to determine a position of the first slider member.

5. The shake correction module of claim 1, further comprising:
a pressing magnet arranged at a side of the second slider member: and
a ferromagnet installed in the base plate to correspond to the pressing magnet, the ferromagnet and the pressing magnet cooperating to retain the first and second slider members to the base plate.

6. The shake correction module of claim 1, wherein each of the first drive portion and the second drive portion comprises a piezoelectric motor.

7. The shake correction module of claim 1, wherein the first axis direction and the second axis direction are perpendicular to each other.

8. The shake correction module of claim 1, wherein the support member comprises a plurality of support legs attached to the base plate.

9. The shake correction module of claim 8, wherein support legs of the plurality further comprise a mounting hole with a thread formed on an inner circumferential surface thereof, and
wherein first installation holes formed in the base plate correspond to the mounting holes of the support legs, the support legs being coupled to the base plate using fasteners inserted in the mounting holes and through the first installation holes.

10. The shake correction module of claim 1, wherein the support member comprises a plurality of pressing portions contacting a surface of the second slider member.

11. The shake correction module of claim 10, further comprising a third support bearing disposed between the second slider member and at least one pressing portion of the plurality.

12. The shake correction module of claim 11, wherein the third support bearing is formed of a ferromagnetic substance and wherein a third bearing groove for installing the third support bearing therein is formed in at least one of the pressing portions, the shake correction module further comprising a second magnet embedded in a part of the pressing portion for centering the third support bearing in the third support bearing groove.

13. The shake correction module of claim 1, further comprising a control circuit board attached to an upper surface of the support member.

14. The shake correction module of claim 1, wherein the first bearing groove and the second bearing groove are formed in the first slider member in a back-to-back configuration, the magnet being embedded between the first bearing groove and the second bearing groove.

* * * * *